United States Patent Office 3,367,897
Patented Feb. 6, 1968

3,367,897
COMPOSITION CONTAINING MICROCRYSTALLINE WAX, OXIDIZED POLYETHYLENE AND PINENE RESIN AND CELLULOSIC SHEETS COATED AND LAMINATED THEREWITH
Hallard C. Moyer, Homewood, Ill., and Robert P. Zmitrovis, Freehold, N.J., assignors to Sinclair Research, Inc., New York, N.Y., a corporation of Delaware
No Drawing. Filed July 16, 1963, Ser. No. 295,505
11 Claims. (Cl. 260—28.5)

This invention relates to petroleum wax compositions which are useful as adhesives or laminants. These compositions can be employed to bond, for instance, cellulosic material of fibrous or non-fibrous nature such as wood, paper, paperboard and cellophane as well as other materials, especially sheet materials including metal foil.

Petroleum waxes and wax-additive blends are used extensively for bonding together two or more plies or sheets of cellulosic materials such as paper, paperboard and other substrates. The resulting laminated products are employed in making various food and non-food containers. A particularly large present use for these compositions is in the manufacture of wax-laminated cartons for packaging cereals and detergents. These cartons are made by bonding a thin sheet of high-cost printed paper to low-cost paperboard. The resulting product is relatively inexpensive since the entire carton is not made of high-quality, glossy, printable paper material and yet the carton has the excellent customer appeal afforded by printing on premium paper instead of on the lower-quality paperboard. The wax adhesive also serves as a gas and moisture barrier, frequently the latter is of major importance, and these considerations have resulted in wax compositions being the choice in manufacturing laminated cartons.

Most laminants have as their primary component microcrystalline petroleum waxes prepared, for instance, by solvent dewaxing and deoiling residual lubricating oil stocks. However, not all microcrystalline waxes are suitable for use as laminants, especially with difficulty bonded papers such as heavily sized sulfite sheet or glassine paper. To improve adhesion of the wax to these substrates, additives, for instance butyl rubber, are sometimes employed. One disadvantage of butyl rubber in particular is its poor solubility in wax, resulting in drop-out and sludging during the laminating operation.

The present invention overcomes problems associated with laminants exhibiting poor wax adhesion or containing partially insoluble additives, by providing a composition containing a defined microcrystalline petroleum wax component and an adhesion-improving additive combination composed of a polyterpene resin and a carboxyl group-containing oxidized polyethylene. These additives in the amounts employed are fully compatible with the base microcrystalline wax and our new formulation exhibits good adhesive characteristics, especially when laminating cellulosic materials.

The petroleum wax component of our composition has a needle penetration (ASTM D1321) of about 15 to 30 at 77° F. This wax ingredient may be a single or straight microcrystalline petroleum wax or a blend of two or more separate microcrystalline waxes, in either event the total microcrystalline wax component has the noted penetration. We prefer that the microcrystalline wax ingredient, which is the major part of the composition, be a blend of about 75 to 95 weight percent of a relatively hard microcrystalline petroleum wax, for instance having a congealing point of about 150° to 175° F. (ASTM D127), preferably about 155 to 170° F., needle penetration at 77° F. (ASTM D1321) of about 10 to 20, viscosity of about 70 to 90 SSU at 210 F., and refractive index $n_D^{80}$ of about 1.4460 to 1.4510; and about 5–25 weight percent of a relatively soft microcrystalline petroleum wax having a congealing point of about 110 to 135° F., a viscosity of about 80 to 100 SSU at 210° F., a needle penetration of about 50 to 150 at 77° F., and a refractive index $n_D^{80}$ of about 1.4500 to 1.4540. Most advantageously, the microcrystalline wax component contains about 80–90% of the hard wax and about 10–20% of the soft wax. The above percentages are based on the total of the hard and soft microcrystalline waxes.

By blending the hard and soft wax components, we achieve a good balance between cohesive strength and adhesive strength, as compositions which are too soft or too hard may exhibit poor cohesiveness while waxes that are too hard will tend to promote adhesive failure. The wax base of our composition may contain minor amounts of other waxes, for instance, up to about 20% or perhaps more of paraffin wax, as long as a blend of the total petroleum waxes has the designated penetration.

As previously noted, one of the essential additives in our wax composition is a polyterpene resin which is usually present in a minor amount of, say, about 0.1 to 20 weight percent, preferably about 2 to 5 weight percent, of the composition. Excessive amounts of the terpene resin might cause brittleness and reduced flexibility. The oxidized polyethylene additive is generally used in an amount of about 0.1 to 10 weight percent, preferably about 0.5 to 2 weight percent, of the composition, Excessive amounts of the oxidized polyethylene may reduce wax penetration of the substrate at a given temperature, resulting in decreased sealing strength. The composition may contain minor quantities of other wax additives as long as the essential characteristics of the composition are not unduly adversely affected.

The wax-compatible terpene resin additives of this invention are polymers of pinene, e.g. alpha-, beta- or their mixtures, and generally have a Ring and Ball softening point of at least about 210° F. The preparation and description of alpha-pinene polymers appear in U.S. Patent 2,802,813 to Maguire et al., herein incorporated by reference. The preparation and description of beta-pinene polymers are set forth in U.S. Patent 2,335,912 to Burroughs and in an article by Powers and Pflum, I. & E. C., 53, 5:372–374, both incorporated herein by reference. These two types of resin are similar in appearance, physical properties, and utility in this invention. Pinene resins having a Ring and Ball softening point of about 210 to 260° F. are preferred for use in the present invention.

The oxidized polyethylene employed in our composition has been oxidized through reaction with oxygen sufficiently to introduce carboxylic groups. These resins are described in U.S. Patent 3,117,101 to Hallard C. Moyer and in U.S. Patent 3,060,163 to Erchak. These polymers have molecular weights of at least about 750, preferably at least about 2000, and are essentially of polymethylenic configuration. The oxidized product is wax-compatible, i.e. dispersible, miscible or soluble in wax; however, it is preferred that the molecular weight not be greater than about 25,000. In order to realize full benefit, the degree of oxidation should be sufficient that at least one carboxylic group is introduced for each 15 average molecules, and preferably form each 1–3 average molecules. However, benefits may be obtained from lesser degrees of carboxylic content. A polyethylene resin of the above degree of oxidation substantially retains its rigidity and hardness. A preferred oxidized polyethylene resin will exhibit a needle penetration (100 g./5 sec./77° F.) of about 0.4 mm. or less and have an acid number of about 5 to 20.

At least two examples of oxidized polyethylene are now commercially available. "Epolene E-10" is marketed by Eastman Chemical Products, Inc. It has an average molecular weight of about 2500, an acid number of about 8–12, and a saponification number of about 20–25. A-C Polyethylene 629, marketed by Allied Chemical Corporation, has an average molecular weight of about 2000, an acid number of about 14–17, and a saponification number of about 25–30. Both "Epolene E-10" and A-C Polyethylene 629 contain about one carboxylic group for each 2 average molecules. In addition, polyethylenes of higher molecular weight can be partially oxidized to form products satisfactory for purposes of this invention. The only restriction on the molecular weight of polyethylene which can be satisfactory utilized is that distated by convenience of oxidation and blending. Polyethylenes having a molecular weight greater than about 25,000 have high melt viscosity and contribute to unduly high viscosity and inconvenience of blending in wax compositions.

The oxidized polyethylene may be treated, for instance, to remove any objectionable odor, especially when the final formulation is to be used in making cartons for food. These oxidized polyethylenes can be produced by removing from the oxidized polyethylenic resin substantially all oxygenated materials having a molecular weight below about 400, e.g. usually no more than about 0.2% of these materials are present. The oxygenated materials removed have been shown to be corrosive to metal surfaces, for instance, containing iron, copper, zinc, or tin, and if added to wax compositions may make them corrosive to such metals.

Various methods for the removal of materials of this molecular weight range can be employed as long as they do not unduly deleteriously affect the desired properties of the resin. A preferred method for removing these materials is by passing an inert gas such as nitrogen or steam through molten oxidized polyethylenic resin in the absence of air or other molecular oxygen-containing gas, usually while the resin is maintained at a temperature of about 300 to 500° F., preferably about 320 to 400° F. By molten polyethylenic resin is meant a resin which is at a temperature so as to possess fluid, liquid or flow characteristics without substantial degradation. The undesirable, light, odoriferous oxygenated materials may be removed by other methods, as an example by extraction with for instance an isobutyl alcohol solvent, or methyl isobutyl ketone, etc.

A microcrystalline wax blend particularly suitable for use in our compositions, is comprised of a relatively hard microcrystalline wax which tested as follows:

| | |
|---|---|
| Gravity, ° API | 34.0 |
| Congealing pt., ° F. | 164 |
| Saybolt viscosity, SSU at 210° F. | 82 |
| Needle penetration at 77° F. | 15 |
| Refractive index at 80° C. | 1.44830 |
| Percent oil | 0.32 | and a relatively soft microcrystalline foots wax which tested as follows:

| | |
|---|---|
| Gravity, ° API | 33.4 |
| Congealing pt., ° F. | 125 |
| Saybolt viscosity, SSU at 210° F. | 84.9 |
| Needle penetration at 77° F. | 70 |
| Refractive index at 80° C. | 1.45210 |
| Percent oil | 1.3 |

These wax stocks can be prepared by conventional vacuum distillation of a mixed-base petroleum crude oil to separate the fractions boiling below 1050° F. The resulting residual stock is deasphalted by conventional propane extraction. The deasphalted oil is then dearomatized by the usual phenol treating and dewaxed at −8° F. by solvent dewaxing employing a 50–50 mixture of methyl ethyl ketone and toluene as the solvent. The resulting petrolatum is deoiled by contact with methyl ethyl ketone-toluene solvent at 35–50° F. to give the relatively hard microcrystalline wax and a first foots oil. The latter material is deoiled at 10–20° F. to produce the relatively soft, flexible, microcrystalline foots wax.

A preferred composition of our invention is afforded by blending 86% of the 164° F. congealing point microcrystalline wax and 14% of the 125° F. congealing point microcrystalline foots wax. To this base blend at an elevated temperature of about 260° F. to melt the waxes, are added 4% of beta pinene terpene resin of 239° F. softening point, average molecular weight of 1200 and density of 0.98; and 1% of oxidized polyethylene of 221° F. Ring and Ball softening point, 0.94 density, 14.4 acid number and approximately 2500 average molecular weight. This composition tested as follows:

| | |
|---|---|
| Gravity, ° API | 33.6 |
| Viscosity, SSU/210° F. | 94.9 |
| Needle penetration at 77° F. | 20 |
| Needle penetration at 100° F. | 57 |
| Congealing point, ° F. | 167 |

This composition was evaluated as a laminant and the results are reported in Table I.

Evaluation of the formulation was accomplished by coating the composition on various substrates at coating weights of 4.5 to 5.5 pounds/ream on the front and 2.0 to 4.0 pounds/ream on the back. The substrates used were 25 pound bleached sulfite paper, 60 pound starch sized sulfite paper and 25 pound unplasticized amber glassine. Two specimens of a substrate were sealed face to face at a sealing temperature of 225° F. (modified TAPPI T642sm54 procedure) and were cooled and aged in a 50% room humidity environment at 75° F., for at least 24 hours before delamination. Delamination was performed on an Instron Tensile Tester at a coss-head speed of 5 inches per minute. Test temperatures of 75° F. and 40° F. were investigated. The latter specimens were aged for one hour at the 40° F. temperature before desealing.

The data obtained in evaluating the composition of this invention are reported in Table I.

TABLE I

| | Seal Strength, grams/3 inches above that of 100% Base Microcrystalline Wax | | | | | |
|---|---|---|---|---|---|---|
| Temperature | 75° F. | | | 40° F. | | |
| Substrate | 25 lb. sulfite | 60 lb. starch sized sulfite | Unplasticized Amber Glassine | 25 lb. sulfite | 60 lb. starch sized sulfite | Unplasticized Amber Glassine |
| 99% Base Microcrystalline Wax plus 1% oxidized polyethylene | 245 | 93 | 223 | 142 | 23 | 50 |
| 96% Base Microcrystalline Wax plus 4% polyterpene resin | 125 | 21 | 40 | 20 | 5 | 1 |
| 95% Base Microcrystalline Wax plus 1% oxidized polyethylene plus 4% polyterpene resin | (¹) | 232 | 287 | 302 | 32 | 65 |

¹ Tear seal.

As can be seen from the data of Table I, the increase in sealing strength at 75° F. of our composition was outstanding, especially with the 60-pound starch sized sulfite paper. Similar results were obtained at 40° F. with the 25-pound sulfite paper. At temperatures of the order of 40° F. waxed paper seals may be weakened by strains created from the uneven shrinkage rate of the wax and paper.

It is claimed:

1. A wax composition suitable as a bonding material consisting essentially of a major amount of microcrystalline petroleum wax, about 0.1 to 20 weight percent of a wax-compatible pinene resin having a Ring and Ball softening point of about 210 to 260° F. and about 0.1 to 10 weight percent of a wax-compatible, carboxyl group-substituted, oxidized polyethylene resin containing at least one carboxylic group for each 15 average molecules and having a molecular weight of about 750 to 25,000, with the proviso that the petroleum wax component of said composition has a needle penetration of about 15–30 at 77° F.

2. The composition of claim 1 wherein the microcrystalline petroleum wax is a blend of about 75–95% of a petroleum microcrystalline wax having a congealing point of about 150–175° F., a needle penetration at 77° F. of about 10–20, a viscosity of about 70–90 SSU at 210° F. and a refractive index $n_D^{80}$ of about 1.4460 to 1.4510; and about 5–25% of a microcrystalline petroleum wax having a congealing point of about 110 to 135° F., a viscosity of about 80–100 SSU at 210° F., a needle penetration of about 50–150 at 77° F. and a refractive index $n_D^{80}$ of about 1.4500 to 1.4540.

3. The composition of claim 2 wherein the oxidized polyethylene has an acid number of about 5–20 and a molecular weight of about 2000 to 25,000.

4. The composition of claim 3 wherein the microcrystalline wax component contains about 80–90% of the about 150–175° F. congealing point microcrystalline wax and about 10–20% of the about 110–135° F. congealing point microcrystalline wax, the pinene resin is about 2 to 5% of the composition and the oxidized polyethylene is about 0.5 to 2% of the composition.

5. A flexible wrapping sheet material coated with the composition of claim 1.

6. A flexible cellulosic wrapping sheet material coated with the composition of claim 1.

7. A flexible cellulosic wrapping sheet material coated with the composition of claim 2.

8. A flexible cellulosic wrapping sheet material coated with the composition of claim 4.

9. A laminated product formed by heating to sealing temperature a flexible wrapping sheet material and a flexible cellulosic wrapping material coated with the composition of claim 1.

10. A laminated product formed by heating to sealing temperature a plurality of flexible cellulosic wrapping sheet materials having disposed therebetween the composition of claim 2.

11. A laminated product formed by heating to sealing temperature a plurality of flexible cellulosic wrapping sheet materials having disposed therebetween the composition of claim 4.

References Cited
UNITED STATES PATENTS

| | | | |
|---|---|---|---|
| 3,117,101 | 1/1964 | Moyer | 260—28.5 |
| 3,236,796 | 2/1966 | Moyer | 260—28.5 |
| 3,243,396 | 3/1966 | Hammer | 260—28.5 |

MORRIS LIEBMAN, *Primary Examiner.*

J. A. GAZEWOOD, H. S. KAPLAN, *Assistant Examiners.*